Oct. 15, 1935. E. D. BAYLEY 2,017,580
ENSILAGE CUTTER AND BLOWER
Filed June 15, 1929 5 Sheets-Sheet 1
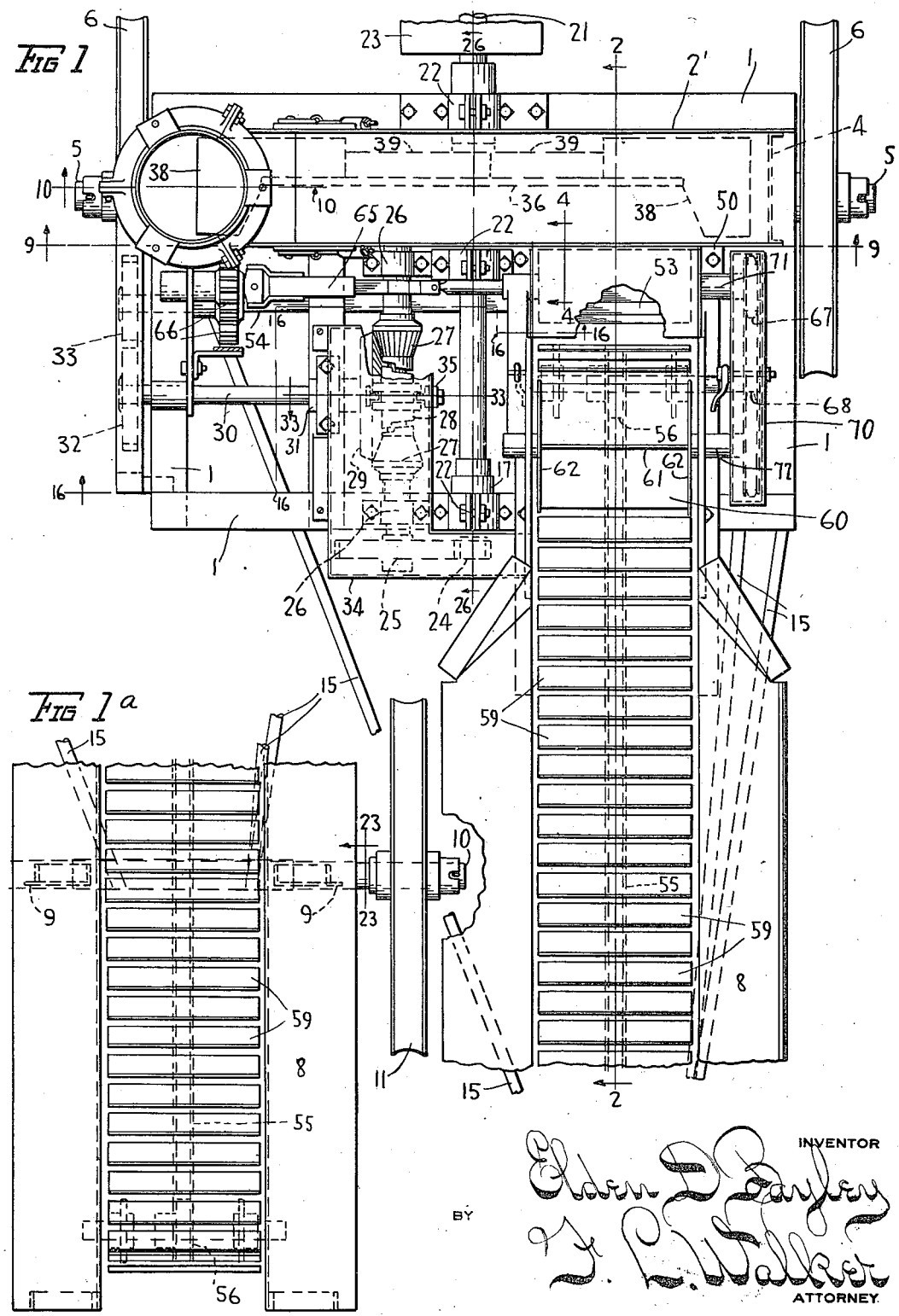

Oct. 15, 1935.  E. D. BAYLEY  2,017,580
ENSILAGE CUTTER AND BLOWER
Filed June 15, 1929  5 Sheets-Sheet 2
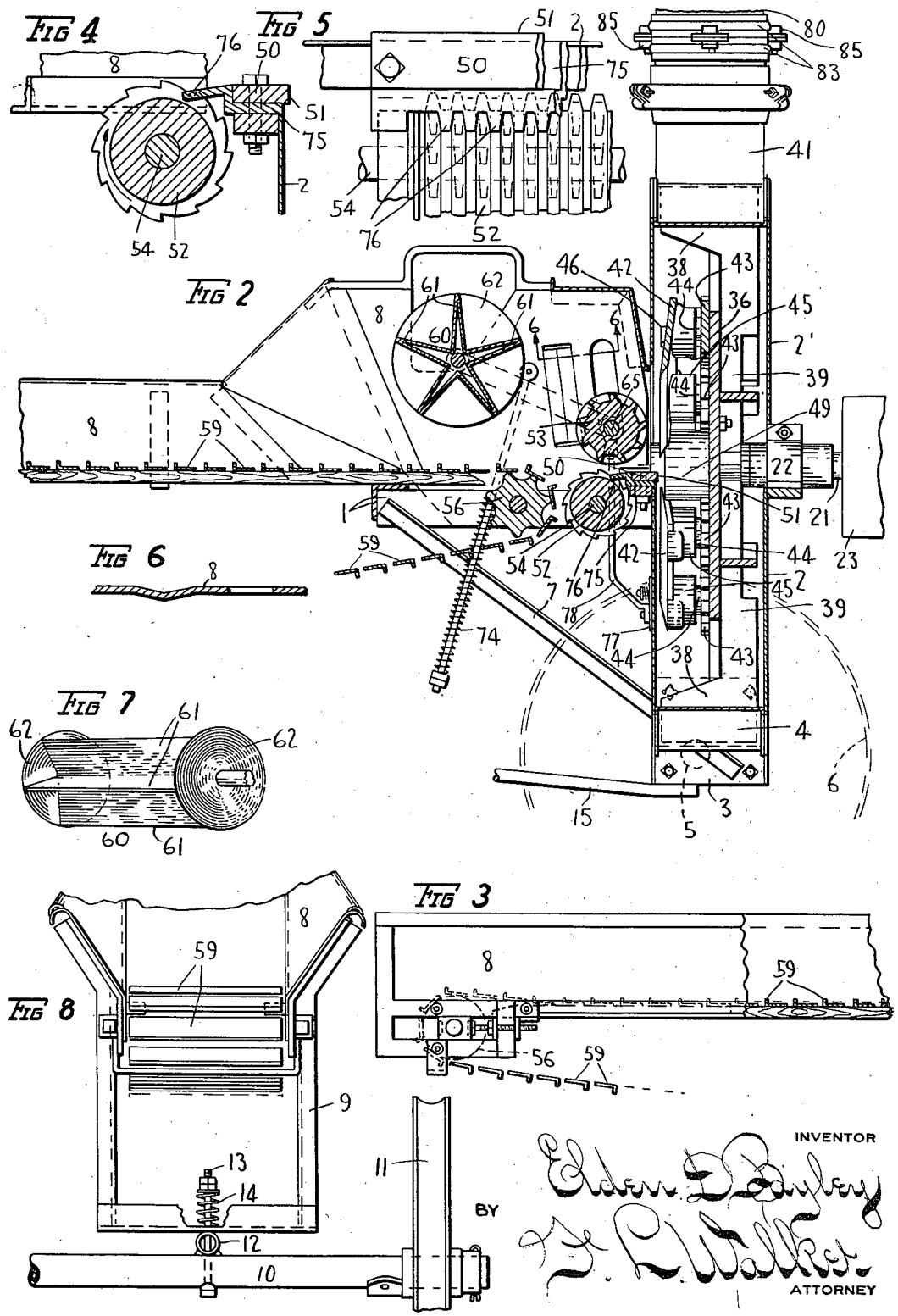

Oct. 15, 1935.  E. D. BAYLEY  2,017,580
ENSILAGE CUTTER AND BLOWER
Filed June 15, 1929  5 Sheets-Sheet 3
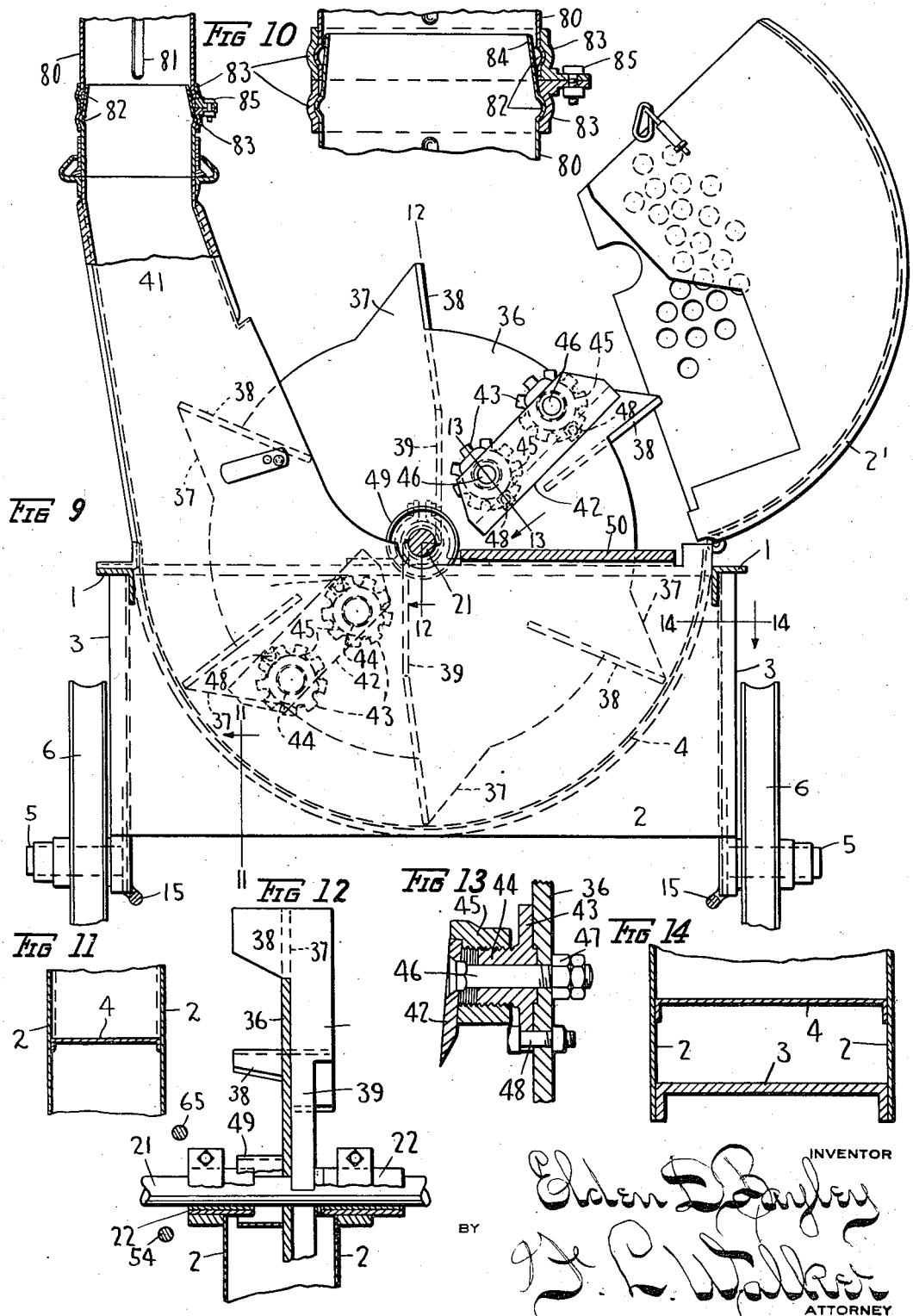

Oct. 15, 1935.  E. D. BAYLEY  2,017,580
ENSILAGE CUTTER AND BLOWER
Filed June 15, 1929  5 Sheets-Sheet 4
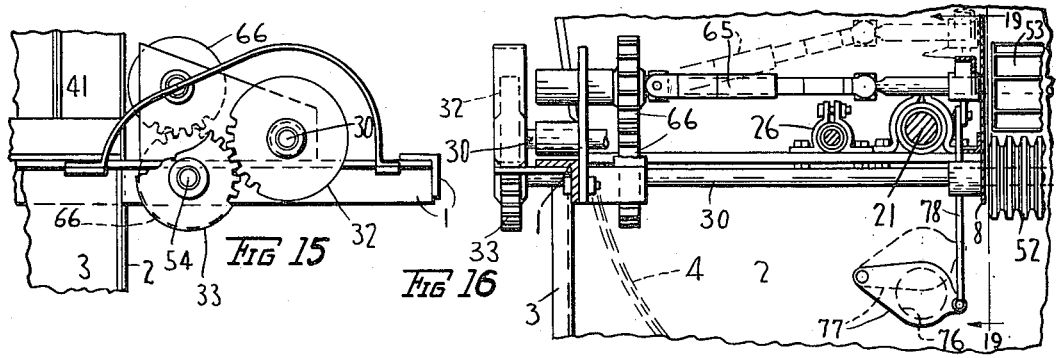
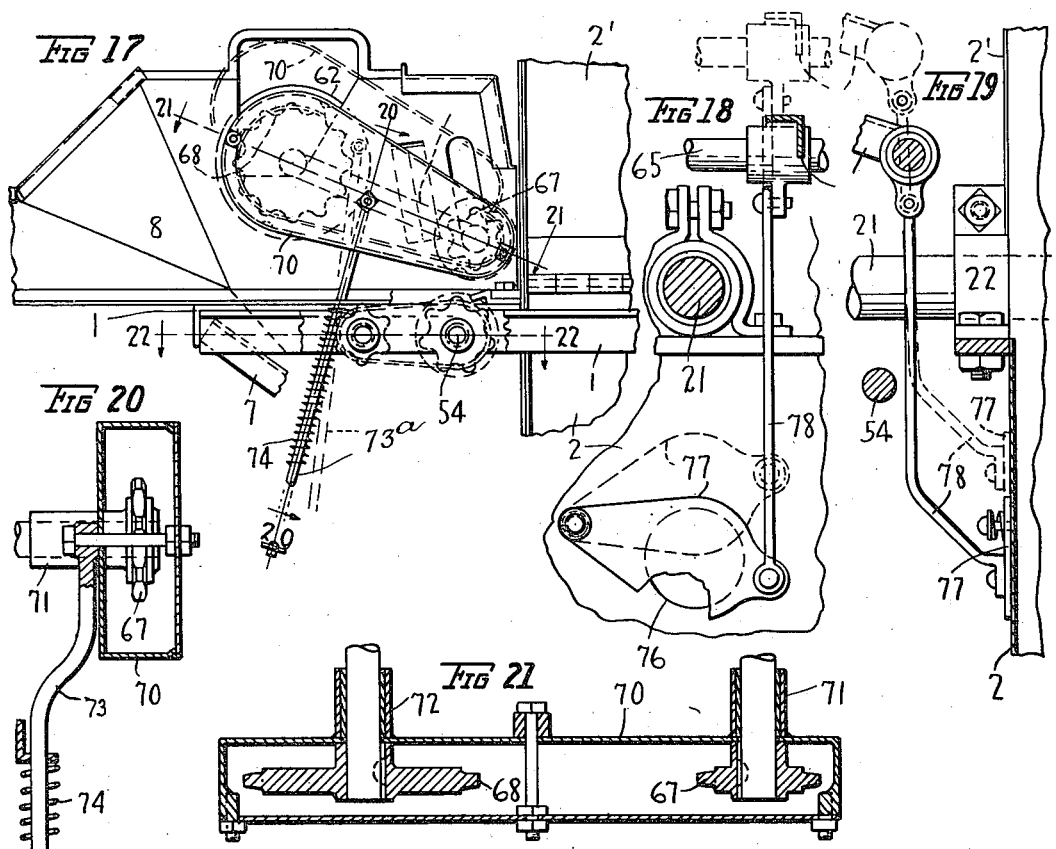
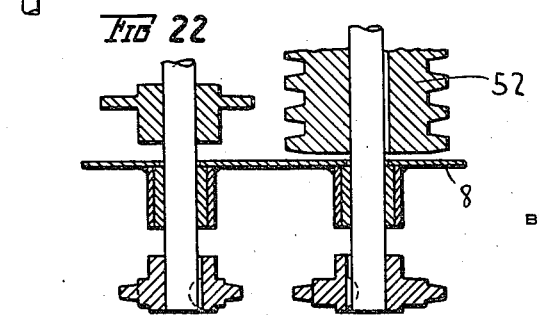

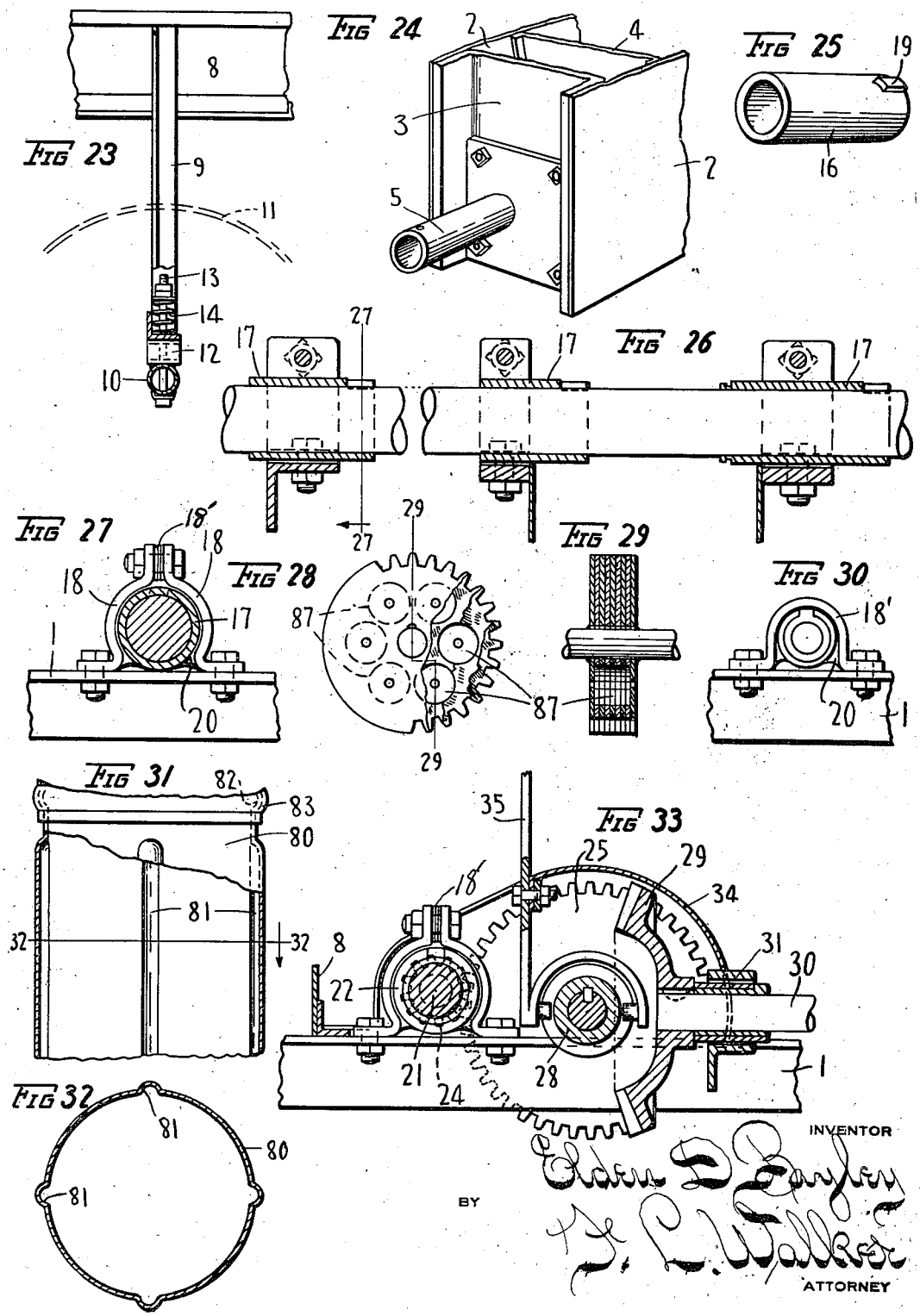

Patented Oct. 15, 1935

2,017,580

UNITED STATES PATENT OFFICE 2,017,580

ENSILAGE CUTTER AND BLOWER

Elden Dicus Bayley, Springfield, Ohio

Application June 15, 1929, Serial No. 371,172

16 Claims. (Cl. 146—107)

This invention relates to vegetation or fodder choppers of the rotary disc type and more particularly to an ensilage cutter and blower for preparing and elevating green fodder into a silo or other storage compartment.

Such machines are power operated and perform heavy duty in severing the green fodder and stalks into short lengths, and subsequently transporting the material to high altitude, and consequently are subject to severe strains and stresses. To withstand such usage, the present machine is provided with a main frame, the portions of which are electrically welded into a unitary structure, as is also the rotary blower head and its drive shaft and vanes, upon which head the cutter blades are adjustably mounted.

It being commercially impractical to electrically weld the frame parts with such accuracy as to present the various bearings in true and proper relation, mountings are provided upon the frame in which bearings are temporarily adjustable into proper relationship. The bearings being located and trued relative to the frame and each other by a suitable jig or fixture, the bearings are immovably welded in their adjusted positions, the adjustment and spacing of the bearings relative to the frame and mounts being compensated for by deposits of fused metal during the electric welding operation. The blower housing is likewise a welded unit and is utilized as a part of the supporting structure, to which are attached stub axles for carrying wheels of small diameter which not only lowers the center of gravity and enables the machine to better take the belt pull from the driving motor, but it also makes the machine a more convenient height for the operator and enables it to be easily converted from stationary to portable type and vice versa.

The fodder is advanced to the rotary disc, which carries both the cutter blades and the blower fan vanes, through a trough having a traveling conveyor bottom, which, with inclined braces, forms a trussed structure. From the feeding conveyor the material passes under a compression roll having radial blades or vanes of sheet material electrically welded into a unitary structure, having intermediate the vanes deep V-shaped pockets. Such element is quite effective in affording a beating or hammering action upon the more or less loose material preparatory to its reception by the feed rolls. These rolls and the compression roll are relatively adjustable to automatically compensate for variation of the volume of material passing thereby, and have the bearings for the floating members mounted in shifting guard housings. Such machines are often operated by careless workmen who not infrequently neglect to replace gear housings and safety devices. In the present design, the safety appliances and guards are utilized, where possible, as supports for operating parts, adjusting elements, and for bearing carriers so that the guards and safety appliances become essential parts of the operating structure, the omission of any one of which renders the machine inoperative. Thus the careless operator is compelled to restore any part removed, and the highest degree of safety is insured.

To avoid breakage of gear teeth incident to the abuse and neglect to which such machines are ordinarily subjected, the driving gears are built up from a series of laminations stamped from sheet metal. Such gears will carry intermediate their laminations a supply of lubricant to be exuded in operation, and an oil reservoir may be provided by perforating intermediate laminations, to afford automatically the lubrication which is frequently neglected upon this class of machines.

The blower housing is formed in separable sections with its discharge neck aligned with the point of discharge of the blower disc and is provided with an auxiliary air inlet opening automatically adjusted by the floating action of the feed rolls to proportion the air supply to the blower in accordance with the volume of material being passed through the machine. The stack through which the material is discharged is longitudinally corrugated to afford air passages exteriorly of the body of ensilage whereby a stratum of air is interposed between the body of ensilage and the interior wall of the stack thus reducing friction and minimizing whirling action of the material. The stack sections are peripherally grooved to receive a correspondingly grooved coupling collar to afford a stiff joint of maximum strength and enable the use of lighter gage material.

The object of the invention is to simplify the structure as well as the means and mode of operation of such machines whereby they will not only be cheapened in construction but will be more efficient in operation, positive in action, possess maximum capacity output with minimum power requirement, easily controlled and unlikely to get out of repair.

A further object of the invention is to provide a frame structure which will be strong and rigid but of comparatively light weight and capable of withstanding severe strains and stresses.

A further object of the invention is to provide means for utilizing electric welding for uniting the frame parts and to provide a method for fixedly locating in trued relation the various bearings upon such frame, and to provide bearing mountings which are temporarily adjustable into proper relationship and subsequently welded in assembled positions.

A further object of the invention is to provide a machine of the present type which is easily convertible from stationary to portable form, and in which the center of gravity will be comparatively low.

A further object of the invention is to provide an improved form of rotary cutter head and blower disc wherein the several parts which are subjected to severe strain and shock are integrally united by welding, including the vanes of the blower disc and its drive shaft.

A further object of the invention is to provide improved means for adjusting the cutter blades upon such rotary disc.

A further object of the invention is to provide an improved form of blower housing of rigid construction preferably welded which may be utilized as a part of the supporting structure of the machine.

A further object of the invention is to provide improved feeding means for the green fodder and to provide a compression or beater roll of welded sheet metal construction having radial vanes and deep intermediate pockets and to further provide for floating adjustment of the compression and feed roll to automatically compensate for variations of the volume of material passing thereunder.

An important feature of the invention is the utilization of guard housings and safety devices for other purposes essential to the operation of the mechanism whereby the machine becomes inoperative in the absence of such safety guard.

A further object of the invention is to provide an improved form of blower stack wherein a stratum of air is utilized interiorly of the stack intermediate the body of material passing therethrough and the wall of such stack to minimize friction and to reduce the tendency of such materials to rotate or whirl within the stack.

A further object of the invention is to provide an improved form of coupling joint for the stack sections and to further provide improved forms of driving gears for the several parts, especially adapted to withstand the abuse and neglect to which such machines are subjected by forming such gears of stamped metal laminations whereby the teeth are not easily broken, and which will automatically feed lubrication from between the laminations.

A further object of the invention is to provide means for automatically and manually varying the volume of air supplied to the blower mechanism in accordance with the volume of material being discharged therethrough.

With the above primary and other incidental objects in view, as will more fully appear in the specification, the invention consists of the features of construction, the parts and combinations thereof and the mode of operation or their equivalents as hereinafter described and set forth in the claims.

In the accompanying drawings, wherein is shown the preferred but obviously not necessarily the only form of embodiment of the invention, Fig. 1 is a top plan view of the assembled machine forming the subject matter hereof, the feeding conveyor of which is partly broken away.

Fig. 1a is a top plan view of the continuation of the feeding conveyor illustrated in Fig. 1.

Fig. 2 is a vertical sectional view on line 2—2 of Fig. 1 and viewed toward the left.

Fig. 3 is a detail side elevation of a portion of the feeding conveyor and comprises a continuation of Fig. 2 toward the left.

Fig. 4 is an enlarged vertical sectional view on line 4—4 of Fig. 1.

Fig. 5 is an enlarged fragmentary top plan view of the parts shown in Fig. 4.

Fig. 6 is an enlarged detail sectional view on line 6—6 of Fig. 2.

Fig. 7 is a perspective view of the compression roller.

Fig. 8 is an end elevation of the front end of the feeding conveyor and supporting frame showing its mounting upon the front axle of the carrying wheels.

Fig. 9 is a front elevation of the rotary cutter and blower head, the view being taken on line 9—9 of Fig. 1.

Fig. 10 is an enlarged detail sectional view of the blower stack coupling, which is also illustrated in Fig. 9.

Fig. 11 is a detail sectional view of the lower portion of the blower housing on line 11—11 of Fig. 9.

Fig. 12 is a detail sectional view of the rotary blower and cutter head and its mounting, the view being on line 12—12 of Fig. 9.

Fig. 13 is an enlarged detail sectional view of the cutter knife mounting taken on line 13—13 of Fig. 9.

Fig. 14 is a detail sectional plan view of a portion of the blower housing taken on line 14—14 of Fig. 9.

Figs. 15 and 16 are detail views of a portion of the driving mechanism for the beater and feed roll, Fig. 16 being taken on the line 16—16 of Fig. 1, while Fig. 15 is a view of the same mechanism from the left.

Fig. 17 is a detail side elevation from the right of Fig. 1 illustrating a continuation of the roll driving means.

Figs. 18 and 19 are detail views at right angles to each other illustrating the means for regulating the supply of air to the blower housing in accordance with the variation of the volume of material being fed.

Fig. 20 is a detail sectional view illustrating the retractive means for the floating driving mechanism for the beater and feed rolls, taken on the line 20—20 of Fig. 17.

Fig. 21 is a detail sectional plan view through the floating guard housing for the compression and feed roll driving means, the view being on line 21—21 of Fig. 17.

Fig. 22 is a detail sectional view on line 22—22 of Fig. 17.

Fig. 23 is a detail sectional view complementary to Fig. 8 showing the flexible mounting of the machine frame upon the carrying wheel axis, the view being taken on line 23—23 of Fig. 1a.

Fig. 24 is a detail perspective view of the stub axle for the rear carrying wheel mounted upon the lower portion of the blower housing.

Fig. 25 is a detail perspective view of a replaceable bearing bushing.

Fig. 26 is a detail sectional view of the shaft mounting on line 26—26 of Fig. 1.

Fig. 27 is a detail transverse sectional view thereof on line 27—27 of Fig. 26.

Figs. 28 and 29 are respectively a side elevation and transverse sectional view of a laminated gear, Fig. 29 being taken on line 29—29 of Fig. 28.

Fig. 30 is a detail elevation of a modification of the bearing mounting otherwise illustrated in Fig. 27.

Fig. 31 is a vertical sectional view, and Fig. 32 a transverse sectional view of the blower stack.

Fig. 33 is a detail sectional view of a portion of the driving mechanism, the view being taken on line 33—33 of Fig. 1.

Like parts are indicated by similar characters of reference throughout the several views.

The machine, forming the subject matter hereof, is especially intended for agricultural or farm use for the preparation and storing of ensilage for animal feed. Ensilage usually consists of green corn; stalks as well as the ears of grain and foliage being cut to short lengths and preserved in a silo. However, other growths may be cut and preserved in the same manner. The present machine is not only suitable for cutting the green material, but is adapted for heavy duty in cutting ripe or cured stalks of fodder or stover, and with minor changes in the feeding devices, may be utilized for chopping root crops, such as beets, rutabagas or other vegetable growths.

The usual silo is quite tall, and the most convenient manner of elevating the ensilage or chopped material for filling the silo from its top, is by means of a blower fan by which the chopped material is discharged through an upstanding conduit pipe or stack leading to the top of the silo.

The ordinary type of farm laborer who operates such machine is usually careless and abusive in the care and operation of machinery, therefore, such machines must be constructed to meet conditions of use, and resist injury and breakage not ordinarily encountered in the use of machinery in other industries and in the hands of skilled operators. Therefore, the present machine has been designed not only to accomplish the particular work in view, but also to withstand an abnormal and unusual amount of abuse and neglect.

In general the construction consists of front and rear wheeled sections interconnected by a feeding hopper or trough having a traveling conveyor bottom, which trough interconnects the front and rear wheeled sections and discharges the material into the path of radially disposed cutter knives mounted upon a rotary disc within a blower housing which forms an integral part of the rear wheeled section. The disc is provided with radially disposed peripheral vanes or fan blades which discharge the severed material through a vertically disposed conduit or stack leading from the blower housing.

Referring to the drawings, 1—1 indicate the angle bar members of the rectangular main frame with which is integrally united the lower section 2 of the blower housing. This lower section 2 of the blower housing is of rectangular box-like form having parallel spaced front and rear walls of sheet material separated by inset channel shaped end walls 3—3 united with the side walls of the housing by electric welding. Interiorly of this box-like structure is a semi-circular division wall 4 defining the lower periphery of the blower chamber. This blower housing section 2 projects a considerable distance below the level of the main frame 1—1, and its end walls 3 carry stub axles 5 fixedly secured thereto for the rear carrying wheels 6. Such lowering of the axles 5 below the plane of the main frame 1, enables the use of comparatively small carrying wheels thereby lowering the center of gravity of the machine. This enables the machine to receive a belt drive more effectively and to resist the belt pull, and also renders the machine more convenient for feeding operation.

This rear section is suitably braced by diagonal brace bars 7 to form a rigid structure. Mounted upon this main frame at its rearward end and extending forwardly thereof a considerable distance, is a feeding hopper or conveyor trough 8, the forward end of which is supported upon a bolster or auxiliary frame member 9 having pivotal connection with the front axle 10 upon which are mounted the forward carrying wheels 11.

For economy of manufacture, the forward axle 10 may be a pipe section, secured to which at mid-length, is a transverse short length of pipe 12 which forms a rest and fulcrum mounting for the bolster or auxiliary frame 9. A kingbolt 13 extends through the axle and intermediate bearing pipe section 12 and through the base of the bolster or auxiliary frame 9, above which it carries a tensioned helical spring 14. This affords a flexible coupling of the main structure with the forward axle, not only allowing the relative tilting and skew adjustment of the structure incident to uneven ground over which it may be transported, but also allowing the axle 10 to pivot upon the kingbolt 13 in turning The bolster or auxiliary forward supporting frame 9 is pivotally connected with the rearward main frame by diagonal brace bars 15 to form a trussed rigid structure.

As a means of rigid and economical assembly and to prevent loosening of joints and resulting unalignment of the bearings, the supporting frame is assembled by electric welding the portions thereof one to another. The members 1 of the rectangular main frame are electrically welded one to another and to the lower section of the blower housing 2, the parts of which are similarly united. Also the various brace members are united with the structure by welding.

It is mechanically and commercially impracticable to weld such frame members with sufficient accuracy to insure perfect alignment of the various bearings. The main frame bearings for various driving shafts comprise bearing sleeves or bushings 16 of Babbitt metal or other suitable bearing material as shown in Fig. 25, removably located in split mounting sleeves 17 welded to the main frame structure, and contracted upon the bushing or bearing sleeve 16 by a clamp yoke 18. The mounting sleeves 17 are located relative to the main frame structure in a true plane established above the level of such frame by means of a jig having suitably located mandrels to receive the split mounting sleeves 17 as is illustrated particularly in Fig. 26 wherein a series of such bearing sleeves are shown mounted upon a locating mandrel by which they are aligned with each other. The various mounting sleeves 17 for different bearings being brought into trued alignment, the intermediate space between such split bearing sleeves and the main frame is filled with fused metal during the welding operation thereby leaving the split mounting sleeves 17 fixedly secured to main frame structure, but in trued relation with each other. The bearing bushings 16 are provided with radially disposed lugs 19 which engage corresponding notches in the split mounting sleeves 17 to prevent relative rotation. The clamp yokes 18 as shown in Fig. 27 or 18' as shown in Fig. 30, are tightened about the split mounting sleeves 17 thereby contracting such sleeves about the bushings 16 to secure the latter in place. The deposit of fused metal by which the spacing of the split mounting sleeves 17 relative to the supporting frame is compensated for, is shown at 20 in Figs. 27 and 30. The extent of such deposit pertaining to different mounting sleeves will vary in accordance with the distance such sleeve must be adjusted away from the main frame structure in order to bring such bearings into a true plane and into proper alignment with each other. Such method of relatively adjusting the mounting into proper and trued relationship and subsequently welding the located mountings to the main frame, permits a wide latitude of variations in the assembly of the main frame which is necessary for practical welding operation.

The main drive shaft 21 is mounted longitudinally of the main frame in bearings 22—22—22, two of which are on the opposite sides of the blower housing through which the main shaft 21 extends. This shaft 21 at its rear end beyond the blower housing 2 carries a drive pulley 23 to be operatively connected by a driving belt with a suitable motor from which power is supplied to the present machine. At its opposite or forward end, the main drive shaft 21 carries a gear pinion 24 meshing with a gear 25 upon a countershaft mounted in bearings 26—26 upon the main frame. This countershaft carries two beveled gear pinions 27 to be alternately connected with such countershaft by a reversible clutch 28. The gear pinions 27 mesh with a bevel gear 29 mounted upon a transverse shaft 30 supported in bearings 31 upon the main frame 1. The shaft 30 carries at its extremity beyond the main frame 1, a gear 32 meshing with a corresponding gear 33 upon the extremity of the shaft of one of the feed rolls and from which the other feed roll and compression or beater roll are actuated as hereafter described. This comprises the main driving system. The driving gears 24 and 25 together with the bevel pinion 27 and bevel gear wheel 29 are enclosed within a guard housing 34. The shift lever 35 for the reversing clutch 28, by which the gear pinions 27 may be alternately connected and disconnected from their drive shaft, is mounted upon the safety guard housing 34. This necessitates the guard housing 34 being in place over this group of driving gears in order that the clutch 28 may be operated. Failure to replace the safety guard housing 34 necessarily renders the machine inoperative. Thus safety is insured by compelling the careless operator to restore the guard housing in the event that it has been removed from the machine.

Within the blower housing 2 and integrally united with the main shaft 21 is a rotary disc 36 preferably formed from heavy boiler plate. At spaced intervals about the periphery of the disc 36 are radially disposed triangular extensions 37 which form bracing brackets to which are integrally united by welding radial blower blades or vanes 38. The blades or vanes 38 extend transversely of the disc 36 and beyond the periphery thereof, being medially secured at their reverse sides to the triangular supporting bracket extensions 37. Such blower blades or vanes are provided with inwardly extending arms 39 extending radially across the face of the disc 36 to its center and united to the disc and to its drive shaft 21 by welding. The path of travel of the blower blades or vanes 38 is closely adjacent to and parallel with the circular wall of the blower housing defined by the arcuate wall 4 in the lower section 2 and the arcuate exterior wall of the upper hinged section 2' of such blower housing. A tapered neck 41 leads diagonally upward from such blower housing, tangentially to the path of travel of such blower vanes and substantially aligned with the center of the line of discharge of ensilage by such blower fan. The neck 41 communicates with a stack slightly offset relative to the fan housing, its axis being substantially tangent to the periphery of the fan housing. Each advancing fan blade 38 serves to momentarily partition the neck 41 from the remainder of the housing while the succeeding blade discharges, thus confining the blowing effect to the neck 41 and the stack and preventing dissipation of elevating power with the fan housing.

Mounted upon the opposite side of the disc 36 are the cutter knives 42. These knives are spaced away from the disc and are slightly inclined to their plane of operation, as is indicated in the sectional view Fig. 13. The knives 42 are mounted upon two-part adjustable heads comprising a revoluble notched disc 43 having a screw threaded hub 44 with which is engaged an internally screw threaded sleeve 45, the outer face of which forms a seat for the cutter blade 42. The knife blade is secured by a bolt 46 extending through a suitable opening in the knife blade having a beveled seat to receive the head of the bolt, the shank of which extends through the hub 44 of the mounting and through the disc 36, and is secured on the opposite side by lock nuts 47. The disc 43 is secured in various positions of rotary adjustment by a keybolt 48 extending through the disc 36 and engaging in one or another of the peripheral notches of the adjusting disc 43. By removing this key bolt 48 and loosening the lock nuts 47, the notched disc 43 may be rotated to adjust the sleeve 45 on which the cutter knife 42 is mounted, toward or from the rotary disc 36, after which the parts are locked by tightening the nuts 47 and replacing the key-bolt 48. The knife bearing side of the rotary disc 36 is preferably provided with a hub flange 49 overhanging the adjacent bearing 22 to protect the bearing against entrance of dirt and grit.

The cutter knives 42 cooperate with a shear bar 50, the shearing edge 51 of which projects slightly within the blower housing 2. The relation of the shear bar 50 is best shown in Figs. 2, 4 and 5.

Closely adjacent to the shear bar 50 and entrance to the blower housing are two feed rolls 52 and 53. The roll 52 is carried upon the transverse shaft 54, which at its opposite end carries the driving gear 33 meshing with the gear 32 on the transverse shaft 30. The feed roll shaft 54 is mounted in fixed bearings upon the structure. However, the coacting feed roll 53 has a vertical floating movement relative to the lower roll 52. The roll 52 is peripherally corrugated, and such corrugations are notched or serrated in a manner similar to ratchet teeth but reversely directed. The upper floating roll 53 is longitudinally corrugated, the corrugations being angular and forming rather sharp marginal edges.

The material being supplied to the machine, is placed within the elongated hopper or feed trough 8, the bottom of which comprises a traveling conveyor consisting of an endless sprocket chain or belt 55 passing about sprocket wheels 56 at the opposite ends of the conveyor and carrying a succession of transverse slats 59, the uppermost run of which advance toward the blower housing and rotary cutter head. This traveling conveyor progressively advances the material deposited in the hopper or feeding trough toward the feed rolls 52 and 53. However, before engaging with such feed roll, the material passes beneath a compression roller or beater 60. This rotary compression element 60 is preferably formed from sheet metal and comprises a series of radial vanes 61, as illustrated in Figs. 2 and 7. These vanes are disposed between terminal circular heads 62 and are separated by intermediate deep triangular pockets. Such rotating reel or compressing element engages the rather loose material as it advances toward the feeding roll, the loose ends being engaged in the pockets intermediate the vanes and pressed downwardly into the plane of operation of the feed roll. The compression reel or roller 60 is actuated from the upper or floating feed roller 53 which in turn is actuated by a flexible shaft 65, extending transversely of the machine in approximately parallel relation with the lower feed roll shaft 54 to which it is operatively connected by intermeshing gear pinions 66, as best shown in Fig. 16. The feed roll shaft of the floating roller 53 and the shaft of the compression roll or beater 60, carry at their extremities sprocket pinions 67 and 68 respectively, connected by a chain belt within a vertically movable or floating safety housing 70. This safety housing 70 carries the bearings 71 and 72 for the trunnion of the feed roll 53 and that of the compressing reel or beater roll 60, as shown particularly in Fig. 21. Such construction not only minimizes the necessary size of the guard housing 70, and insures the driving chain and sprocket pinions being enclosed in all positions of floating adjustment of such feeding roller and compression roller, but again by making the guard housing a necessary and essential part of the structure by mounting the roll bearings thereon, it insures against the removal of such guard housing by a careless operator. The guard housing if removed must necessarily be replaced, since otherwise the machine is rendered inoperative. At the opposite ends of the floating rolls 53 and 60, their trunnions are interconnected by a movable space bar 73 to which is connected a downwardly extending link rod 73a (see Figs. 17 and 20, also Fig. 1). This link rod 73a extends through an opening in one of the frame elements, as shown in Fig. 20, below which it engages with a helical retracting spring 74. The feed roll 53 and compression reel 60 are capable of vertical movement against the tension of the retracting spring 74. Moreover, this vertical movement of the respective elements 53 and 60 may be independent of each other due to a rocking action of the space bar 73 about its pivotal connection with the link rod 73a. That is to say, the feed roll 53 may be forced upwardly a greater degree than the compression reel, or vice versa, the link rod 73a and compression spring 74 compensating for such variable movement. Located beneath the shear bar 50 and overhanging the lower feed roller 52, is a clearing bar 75 having in its margin a series of teeth 76 projecting intermediate the peripheral corrugations of the lower feed roller 52. As a volume of material being served to the machine increases, the floating feed roll 53 and compression reel 60 are forced upwardly against the tension of the retracting spring 74. To handle such increased volume of material through the blower housing, it is desirable to increase the supply of air thereto. However, when a small volume of material is being fed to the cutter head and blower, it is desirable to reduce the air supply in order to minimize the power requirement. To this end, the blower housing 2 is provided with an air inlet opening 76 in its lower portion controlled by a damper 77. This damper 77 is connected by a link 78 with the floating space bar 73 in one end of which the flexible shaft 65 is journalled. Thus as the feed roll 53 and compression reel 60 are forced upwardly by an increased volume of material, the damper is correspondingly elevated to open the air inlet orifice to the blower housing and thus increase the air supply thereto. Such construction is best shown in Figs. 16, 18 and 19, but also in Fig. 2. The feed conveyor is driven by a chain and sprocket driving connection from the lower feed roll 52, as illustrated in Fig. 17, and also Fig. 22.

Leading from the neck 41 of the blower housing, is a sectional stack or blower pipe through which the reduced material is discharged upwardly to the top of the silo. This stack comprises a succession of separable sections to be intercoupled one to the other. These sections are of sheet metal tubular form as indicated at 80. Each section is provided with a series of longitudinally disposed interior channels in its wall. There is a natural tendency of the material to whirl or rotate within the conduit or stack. That is to say, the blown material has a gyratory motion. The introduction of air through the longitudinal channel 81 of the stack section tends to reduce this rotary or gyratory motion. It has the further effect of supplying a comparatively thin stratum of air closely adjacent to the walls of the stack and intermediate the moving material and such walls, thereby minimizing friction by keeping the material away from the stack wall and so inducing a more rapid movement of the material through the stack and minimizing the power requirement. It has been found that this provision of an air supply outside and around the moving body of material prevents choking of the blower fan, facilitates the rapidity with which the material may be reduced, and by causing the chopped material to be withdrawn from the housing as rapidly as severed, it reduces the power requirement very materially. In addition to their longitudinal corrugations, the stack sections are provided with terminal peripheral corrugations 82 which are seated in corresponding grooved reinforcement collars 83. The upper terminal of the lower section of the stack is somewhat reduced as at 84, (Fig. 10) for insertion within the lower end of the next succeeding stack section, and the reinforcement collars are coupled together by clamp bolts 85. The reinforcement collars 83 may be united with the sections by welding or by riveting in addition to the interlocking engagement of their corrugations. It is found, however, that such interlocking corrugated interconnection forms a rigid coupling terminal which is not easily distorted and which will afford a rigid and secure joint.

As before referred to, machines of the present character are subjected to abnormal neglect and are subjected to severe strains and stresses. To afford driving gears which will not quickly deteriorate and which may not be easily broken, the various spur gears, such as the driving gears 24, 25, 32, 33, 66 and others, are preferably though not necessarily of laminated construction, such as is shown in Figs. 28 and 29. In this construction, a series of gear blanks are stamped from sheet material, each having a series of peripheral gear teeth. These blanks are then assembled side by side with their teeth in registry one with another and are secured by spot welding. Preferably, the gear blanks are welded progressively as the stack is assembled. In lieu of welding, such laminae may be united by rivets or other suitable means. Such laminated gear if initially saturated with oil or lubricant will carry such lubricant for a long period of time exuding sufficient from between their laminations during operation to maintain effective lubrication. To increase this lubricant carrying capacity, the intermediate laminae of the series may be formed with openings 87 while the terminal laminae of the series comprising the gear may be formed without such perforations, and thereby comprise closure heads for a reservoir within the gear to receive lubricant.

While the longitudinally corrugated feed roller 53 has proven quite efficient, this efficiency may be increased by making the corrugations somewhat deeper until the roller assumes the form of a paddle wheel, such as shown in Fig. 7, and corresponding in form with the beater roll 60. The vanes of such a roller overlap the ends of the advancing stalks to greater extent, and have the effect of gathering and pushing the elevated stalks downward into the plane of operation of the cutter knife.

To prevent an inexperienced person from tightening the split bearing sleeves too tightly and distorting or breaking the bushing, a series of interchangeable and removable shims 18' are preferably interposed between the relatively adjustable margins of the split sleeve as shown in Figs. 27 and 33.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise the preferred form of several modes of putting the invention into effect and the invention is, therefore, claimed in any of its forms or modifications within the legitimate and valid scope of the appended claims.

Having thus described my invention, I claim:

1. A feeding roll for an ensilage cutter or the like comprising a series of radially disposed trussed vanes formed from sheet metal, revolubly mounted for rotation about their common axis, said means being formed of two sheets of metal intersecting at their periphery and diverging toward the axis of the wheel, adjacent sheets of adjacent vanes being united together at the point of intersection.

2. A feeding roll for an ensilage cutter or the like comprising a series of radially disposed substantially V-shaped vanes formed from sheet metal, a shaft about which the vanes are radially disposed, and circular heads of sheet metal at the extremities of the vanes, the component parts of the structure being interunited by welding.

3. A feeding roll for ensilage cutters or the like including a shaft, a series of sheet metal vanes each comprising spaced walls interconnected at their outer margins radially disposed about the shaft, and sheet metal heads at the opposite ends of the vanes, such component parts being integrally united with each other by welding.

4. In an ensilage cutter and blower, a blower housing, a blower fan therein, a stack leading therefrom, a cutter knife, a movable feed roll engaging the material during its advance to the knife, an air inlet damper to the blower housing, and an operative connection between the air inlet damper and the feed roll whereby the damper is automatically adjusted to vary the air supply to the blower in proportion to the quantity of the material being fed.

5. In an ensilage cutter and blower, the combination with material feeding and cutting means, of a blower fan, a blower housing enclosing the fan and having an auxiliary air inlet opening thereto, and means controlled by the passing material for varying the air supply to said housing in proportion to the quantity of material being fed to the cutter.

6. In an ensilage cutter and blower, the combination with feeding and cutting means, of a blower fan, a blower housing enclosing the fan and having an air inlet opening, an adjustable damper for said opening, and means responsive to the quantity of material being fed to the cutter whereby the supply of air to the blower varies with the quantity of material fed.

7. A machine of the character described, including a main frame the component parts of which are electrically welded one to another into an integral structure, a plurality of expansible and contractible bearing sleeves welded to said main frame, removable bearing bushings insertable in said bearing sleeves, and means for contracting the sleeves upon said inserted bushings, the sleeves being initially positioned in predetermined relation with each other, and bodies of fused metal interposed between the adjusted sleeves and the frame to maintain their adjusted relation.

8. In an apparatus of the character described, a rotary cutter, a feeding device for supplying material thereto and having bodily to and fro movement, an actuating mechanism therefor having bodily to and fro motion in unison with the feeding device, a safety guard for said bodily movable actuating mechanism movable therewith, and bearings for said feeding device carried by the safety guard so that the removal of the safety guard renders the mechanism inoperative.

9. A machine including a main frame, the component parts of which are electrically welded one to another into an integral structure, and a plurality of split sleeves welded to said main frame in predetermined relative positions, bearing bushings insertable within said split sleeves, and clamp yokes arranged about said sleeves and adapted by their adjustment to contract said split sleeves upon said bushings.

10. In a machine of the character described, a rotary cutter, a feeding mechanism for supplying material thereto, a gear train for transmitting motion to the rotary cutter and feeding mechanism, a safety guard member for said gear train, and mechanical control means for the feeding mechanism mounted upon the safety guard member whereby the mechanism is rendered inoperative by the removal of the guard member.

11. In a machine of the character described, a rotary cutter, a revoluble floating member supplying material to said cutter, a driving mechanism for said floating feeding member, a safety gear housing for said driving mechanism capable of a floating motion with the feeding member, and a bearing for said floating feeding member carried by said housing, whereby the removal of the housing necessitates the removal of the bearing and renders the machine inoperative.

12. In a construction of the character described, the combination with material feeding and cutting means, of a rotary blower fan comprising a plate metal disc having spaced triangular projections, plate metal blades arranged transversely of the periphery of the disc and bearing against the triangular projections, and a drive shaft upon which the disc is mounted, the disc, blades and shaft being integrally united one with another by welding.

13. In a construction of the character described, the combination with feeding and blower means of a rotary carrier disc, a cutter knife carried thereby in radially disposed spaced relation, a tie bolt connecting the knife with the carrier disc, a hub member revolubly mounted upon the bolt intermediate the disc and knife, a sleeve having screw threaded engagement with the hub, said sleeve having a seat formed on its outer end for said knife, the spacing of the knife and disc being variable by the adjustment of the hub and bolt, and means for locking the hub in its adjusted position against rotation.

14. In a construction of the character described, the combination with material feeding and cutting means, of a rotary blower fan, a blower housing for said fan, a blower stack having its axis disposed in substantially tangential relation with the periphery of the rotary fan, and a discharge neck inclined to the axis of the stack leading from the blower housing to the stack.

15. In an apparatus of the character described, a rotary cutter, a drive shaft therefor, feed rolls supplying material to the cutter, a drive shaft for the feed rolls, clutch means for connecting and disconnecting the cutter shaft and feed roll shaft, a safety guard enclosing such clutch means, and a lever for controlling the clutch carried by the guard so that the removal of the safety guard will render the mechanism inoperative.

16. In an ensilage cutter, the combination with material feeding and cutting means of a rotary blower fan and blower housing for said fan, a vertically extending blower stack having its axis disposed in a substantially tangential relation with respect to the periphery of the rotary fan, and an outlet neck leading from the blower housing to the stack.

ELDEN DICUS BAYLEY.